United States Patent
Halasa et al.

(10) Patent No.: US 7,279,531 B1
(45) Date of Patent: Oct. 9, 2007

(54) RUBBERY POLYMERS CONTAINING TIN COUPLING AGENTS AND RUBBER COMPOUNDS INCLUDING THE SAME

(75) Inventors: Adel Farhan Halasa, Bath, OH (US); Steven Kristofer Henning, Downingtown, PA (US); Scott K. Armstrong, Akron, OH (US); Jacob Gerhan, Avon Lake, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/682,027

(22) Filed: Mar. 5, 2007

(51) Int. Cl.
*C08F 8/42* (2006.01)
*C08F 4/58* (2006.01)

(52) U.S. Cl. ........... 525/332.3; 525/195; 525/359.3; 525/370; 526/176; 526/335; 526/340; 524/572; 152/450

(58) Field of Classification Search .......... 525/195, 525/370, 332.3, 359.3; 526/176, 340, 335; 152/450
See application file for complete search history.

(56) References Cited

U.S. PATENT DOCUMENTS 5,916,957 A * 6/1999 Itoh et al. ............. 524/496
6,191,234 B1 * 2/2001 Tadaki et al. ........... 525/332.9
7,091,274 B2 * 8/2006 Thielen et al. .......... 524/496

OTHER PUBLICATIONS

Glidwell, C., "The Structures, and Acid-Base Properties of Simple Inorganic Compounds Containing Stannyl Groups: An MNDO Study," Chemica Scripta, 1986, vol. 26, pp. 367-371.

* cited by examiner

*Primary Examiner*—Fred Teskin
(74) *Attorney, Agent, or Firm*—Wood, Herron & Evans, LLP

(57) ABSTRACT

The present invention is directed to rubbery polymers, such as polybutadiene rubber or styrene-butadiene rubber, that contain tin coupling agents and provide desirable dispersion of carbon black in rubber compounds, such as for use in tire treads. The tin coupling agents are defined by the general formulas (I) $(X_3Sn)_2O$ or (II) $(X_3Sn)O—(CH_2)_n—O(X_3Sn)$, wherein X is a halogen and n is 1 to 20. A method of rubbery polymer synthesis, in one embodiment, involves mixing anionically polymerizable conjugated diene monomers with optional vinyl aromatic and an anionic-polymerization initiator, i.e., an organolithium compound, to form a mixture of living polymers. A tin coupling agent is added to the mixture of living polymers effecting polymerization conditions to form the tin coupled rubbery polymer. Such tin coupled rubbery polymers can be utilized in tire tread rubbers where the rubbery polymers may provide desirable wear properties without substantially sacrificing other performance characteristics.

18 Claims, No Drawings

RUBBERY POLYMERS CONTAINING TIN COUPLING AGENTS AND RUBBER COMPOUNDS INCLUDING THE SAME

FIELD OF THE INVENTION

The present invention is directed to rubbery polymers containing tin coupling agents and to rubber compounds including those rubbery polymers that can be used in tires.

BACKGROUND OF THE INVENTION

It is desirable to produce rubber compounds, which include a rubbery polymer(s), exhibiting reduced hysteresis when properly compounded with other ingredients such as reinforcing agents, followed by vulcanization, such rubber compounds being used in tires. The hysteresis of a rubber compound refers to the difference between the energy applied to deform an article made from the rubber compound and the energy released as the rubber compound returns to its initial, undeformed state. In pneumatic tires, lowered hysteresis properties are associated with reduced rolling resistance and heat build-up during operation of the tire. These properties, in turn, result in such desirable characteristics as lowered fuel consumption for vehicles using such tires.

To that end, to alter or manipulate the properties of rubbery polymers, and thus the characteristics of a tire utilizing such rubbery polymer, various modifiers can be incorporated into the rubbery polymer, when that rubbery polymer is compounded, for interacting with reinforcing filler, such as carbon black or silica. For example, it is known to incorporate tin coupling agents, such as tin tetrachloride, i.e., $SnCl_4$, into rubbery polymers in an effort to improve the performance characteristics of tires. However, it would be desirable to increase the bound rubber by maximizing the number of carbon-tin bonds and, thus, further improve upon the performance characteristics of tires. However, due to the unpredictable interactions of the various compounds and chemicals used for synthesizing and compounding rubbery polymers, it can be challenging to formulate useful rubber compounds that provide tires with overall desirable performance characteristics.

It would thus be desirable to provide rubbery polymers containing tin coupling agents and rubber compounds including the same for use in tires, wherein such rubbery polymers can provide desirable dispersion of reinforcing filler and desirable wear properties.

SUMMARY OF THE INVENTION

In accordance with an embodiment of the present invention, rubbery polymers are provided which include at least one type of anionically polymerized conjugated diene monomer and optionally an anionically polymerized vinyl aromatic monomer, and a tin coupling agent reacted with the polymerized monomers to provide tin coupled rubbery polymers, such as for use in tire tread rubbers. The tin coupling agent is defined by the formula (I) $(X_3Sn)_2O$ or (II) $(X_3Sn)O—(CH_2)_n—O(X_3Sn)$, wherein X is a halogen and n is 1 to 20. Such rubbery polymers can provide desirable dispersion of reinforcing filler, such as carbon black and/or silica, and desirable wear properties.

The method of synthesizing such tin coupled rubbery polymers includes anionically polymerizing one or more different types of conjugated diene monomers and optionally vinyl aromatic monomers in the presence of the organolithium initiator compound and tin coupling agent. During polymerization, the halogen atoms of the tin coupling agent can react with lithium terminated chain ends of the polymerized monomers so that the coupling agent attaches thereto to provide a rubbery polymer that is tin coupled, i.e., a tin coupled rubbery polymer. When compounding or further processing the rubbery polymers into a rubber compound, the tin coupling agent may further react with the filler to form a rubber compound having desirable polymer-filler interaction. As such, the rubbery polymers so formed, such as polybutadiene rubber or styrene-butadiene rubber, are tin coupled and useful in the preparation of tire tread rubber compounds, which can exhibit desirable wear and tear characteristics, particularly when such tread compounds contain carbon black.

By virtue of the foregoing, there is provided rubbery polymers containing tin coupling agents, wherein the rubbery polymers can provide desirable dispersion of filler, such as carbon black, in rubber compounds and, thus, desirable wear properties without substantially sacrificing other performance characteristic(s), e.g., traction properties.

DETAILED DESCRIPTION

In accordance with an embodiment of the invention, rubbery polymers are provided which contain tin coupling agents defined by the general formulas (I) $(X_3Sn)_2O$ or (II) $(X_3Sn)O—(CH_2)_n—O(X_3Sn)$, wherein X is a halogen, such as chlorine, and wherein n is 1 to 20. In one embodiment, the tin coupling agent is hexachlorodistannoxane, i.e., $(Cl_3Sn)_2O$, or bis(trichlorostannoxy) butane, i.e., $(Cl_3Sn)O—(CH_2)_4—O(Cl_3Sn)$. These tin coupling agents can provide desirable cold flow characteristics for rubbery polymers, such as styrene-butadiene rubber or polybutadiene rubber, and desirable rolling resistance of tires made therefrom.

To that end, anionically-polymerizable conjugated diene monomers with optional vinyl aromatic monomers and an anionic-polymerization initiator, i.e., an organolithium compound, are mixed together to form a mixture of living polymers. One or more optional modifiers, such as a diamine compound, may be included along with the organolithium compound. A tin coupling agent of formulas (I) or (II) is added to that mixture where coupling occurs at the ends of the living polymers to provide tin coupled rubbery polymers; such tin coupled rubbery polymers may be further compounded, for example, with an appropriate filler, such as carbon black and/or silica, and other desired ingredients, e.g., sulfur curing agents, for use in tires, as further discussed below.

The organolithium compounds used for polymeriziation of the rubbery polymers can include the monofunctional and multifunctional initiator types known for polymerizing conjugated diene monomers. The multifunctional organolithium initiators can be either specific organolithium compounds or can be multifunctional types that are not necessarily specific compounds but rather represent reproducible compositions of regulable functionality. The organolithium initiator can also be a functionalized compound.

The choice of initiator can be governed by the degree of branching and the degree of elasticity desired for the polymer, the nature of the feedstock, and the like. With regard to the feedstock employed as the source of conjugated diene, for example, the multifunctional initiator types generally are selected when a low concentration diene stream is at least a portion of the feedstock since some components present in the unpurified low concentration diene stream may tend to react with carbon lithium bonds to deactivate the activity of the organolithium compound, thereby necessitating the presence of sufficient lithium functionality so as to override such effects.

The multifunctional organolithium compounds which can be used include those prepared by reacting an organomonolithium compounded with a multivinylphosphine or with a multivinylsilane, such a reaction typically being conducted in an inert diluent, such as a hydrocarbon or a mixture of a hydrocarbon and a polar organic compound. The reaction between the multivinylsilane or multivinylphosphine and the organomonolithium compound can result in a precipitate which can be solubilized, if desired, by adding a solubilizing monomer such as a conjugated diene or monovinyl aromatic compound after reaction of the primary components. Alternatively, the reaction can be conducted in the presence of a minor amount of the solubilizing monomer. The relative amounts of the organomonolithium compound and the multivinylsilane or the multivinylphosphine generally should be in the range of about 0.33 to 4 moles of organomonolithium compound per mole of vinyl groups present in the multivinylsilane or multivinylphosphine employed. It is noted that such multifunctional initiators are commonly used as mixtures of compounds rather than as specific individual compounds.

The organomonolithium compounds can include ethyl lithium, isopropyl lithium, n-butyllithium, sec-butyllithium, n-heptyllithium, tert-octyl lithium, n-eicosyl lithium, phenyl lithium, 2-naphthyllithium, 4-butylphenyllithium, 4-tolyllithium, 4-phenylbutyllithium, cyclohexyl lithium, and others known to those having ordinary skill in the art.

The multivinylsilane compounds can include tetravinylsilane, methyltrivinyl silane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane, and others known to those having ordinary skill in the art.

The multivinylphosphine compounds can include trivinylphosphine, methyldivinylphosphine, dodecyldivinylphosphine, phenyldivinylphosphine, cyclooctyldivinylphosphine, and others known to those having ordinary skill in the art.

Other multifunctional polymerization initiators can be prepared by utilizing an organomonolithium compound further in combination with a multivinylaromatic compound and either a conjugated diene or monovinylaromatic compound or both. These ingredients can be charged initially, usually in the presence of a hydrocarbon or a mixture of a hydrocarbon and a polar organic compound as a diluent. Alternatively, a multifunctional polymerization initiator can be prepared in a two-step process by reacting the organomonolithium compound with a conjugated diene or monovinyl aromatic compound additive, and then adding the multivinyl aromatic compound. Any of the conjugated dienes or monovinyl aromatic compounds described can be employed. The ratio of conjugated diene or monovinyl aromatic compound additive employed, in one example, should be in the range of about 2 to 15 moles of polymerizable compound per mole of organolithium compound. The amount of multivinylaromatic compound employed, in one example, should be in the range of about 0.05 to 2 moles per mole of organomonolithium compound.

The multivinyl aromatic compounds can include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene, and others known to those having ordinary skill in the art. In one example, the multivinyl aromatic compound includes a divinyl aromatic hydrocarbon containing up to 18 carbon atoms per molecule. In another example, the divinyl aromatic hydrocarbon can include divinylbenzene, as either the ortho, meta or para isomer, commercial divinylbenzene, which is a mixture of the three isomers, or other compounds such as the ethyl styrenes.

Other types of multifunctional lithium compounds can be used, such as those prepared by contacting a sec- or tert-organomonolithium compound with 1,3-butadiene, at a ratio of about 2 to 4 moles of the organomonolithium compound per mole of the 1,3-butadiene, in the absence of added polar material, with the contacting, for example, being conducted in an inert hydrocarbon diluent. In another example, the contacting is conducted without the diluent.

Alternatively, specific organolithium compounds can be used as initiators, if desired, in the preparation of the rubbery polymers. These can be represented by $R(Li)_x$ wherein R represents a hydrocarbyl radical containing from 1 to 20 carbon atoms, and wherein x is an integer of 1 to 4. The organolithium compounds can include methyl lithium, isopropyl lithium, n-butyllithium, sec-butyllithium, hexyllithium, tert-octyl lithium, n-decyl lithium, phenyl lithium, 1-naphthyllithium, 4-butylphenyllithium, p-tolyl lithium, 4-phenylbutyllithium, cyclohexyl lithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and others known to those having ordinary skill in the art.

The organolithium compound can be an alkylsilyloxy protected functional lithium compound. For instance, the initiator can be an alkylsilyloxy protected functional lithium initiator of the structural formula:

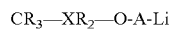

wherein X represents a group IVa element selected from carbon, germanium, or tin; wherein R represents alkyl groups that can be the same or different and that contain from 1 to about 8 carbon atoms; and wherein A represents an alkylene group; or:

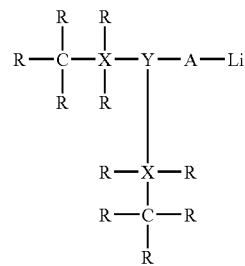

wherein X represents a group IVa element selected from carbon, germanium, or tin; wherein Y represents oxygen, phosphorous, or nitrogen; wherein R represents alkyl groups that can be the same or different and that contain from 1 to about 8 carbon atoms; and wherein A represents an alkylene group; or (c):

CR$_3$—SnR$_2$-A-Li wherein R represents alkyl groups that can be the same or different and that contain from 1 to about 8 carbon atoms, and wherein A represents an alkylene group. The alkylene group can be straight chained or branched. For instance, A can represent a straight chained alkylene group of the structural formula —(CH$_2$)$_n$— or it can represent a branched alkylene group, such as:

-[—CH$_2$—CR$_2$—CH$_2$—]- wherein R represents alkyl groups that can be the same or different and that contain from 1 to about 8 carbon atoms. In one example, R represents an alkyl group containing from 1 to about 4 carbon atoms. In another example, R represents methyl groups.

The alkylsilyloxy protected functional lithium initiator will typically be of the structural formula:

CR$_3$—XR$_2$—O—[—CH$_2$—]$_n$—Li wherein X represents a group IVa element selected from carbon, silicon, germanium, or tin; wherein n represents an integer from 1 to 10; wherein R represents alkyl groups that can be the same or different and that contain from 1 to about 8 carbon atoms; or an alkylsilyloxy protected functional lithium compound of the structural formula:

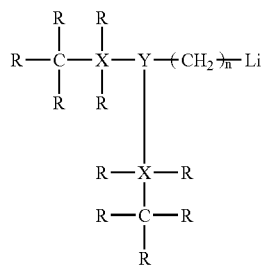

wherein X represents a group IVa element selected from carbon, silicon, germanium, or tin; wherein Y represents oxygen, phosphorous, or nitrogen; wherein n represents an integer from 1 to 10; wherein R represents alkyl groups that can be the same or different and that contain from 1 to about 8 carbon atoms. These rubbery polymers will accordingly normally contain a "living" lithium chain end.

In another example, the alkylsilyloxy protected functional lithium initiator may be of the structural formula:

CR$_3$—SiR$_2$—O—[—CH$_2$—]$_n$—Li wherein n represents an integer from 1 to 10, and wherein R represents alkyl groups that can be the same or different and that contain from 1 to about 8 carbon atoms.

The organolithium compound will normally be present in the polymerization medium in an amount that is within the range of about 0.01 to about 1.5 phm (parts by 100 parts by weight of total monomer). In one example, from about 0.01 phm to about 1.2 phm of the organolithium compound can be utilized. In another example, from about 0.025 phm to about 0.07 phm of the organolithium compound in the polymerization medium can be utilized.

An optional modifier(s), such as a diamine compound, may be provided along with the organolithium compound. The diamine compound may be an aliphatic diamine or a bicyclic chelating diamine compound. The bicyclic chelating diamine compounds generally may be defined as two fused rings with at least one ring including two nitrogen atoms. For example, the bicyclic chelating diamine compound may include 1,4-diazabicyclo[2.2.2]octane (DABCO) and others known to those having ordinary skill in the art. The aliphatic diamines can include primary, secondary, or tertiary amines, or combinations thereof. In one example, the aliphatic diamine is an aliphatic bis-primary diamine, such as ethylene diamine or 1,3-diaminopropane. In yet another embodiment, the aliphatic diamines is an aliphatic bis-tertiary diamine, such as N,N,N',N'-tetramethylethylene diamine ("TMEDA").

The diamine compound will normally be present in the polymerization medium in an amount within the range of about 0.20 to about 8.00 phm (parts by 100 parts by weight of total monomer). The molar ratio of the organolithium compound to the diamine compound may be from about 0.1:1 to about 4:1. In another example, the molar ratio of the organolithium compound to the diamine compound may be from about 1:1 to about 3:1. In yet another example, the molar ratio of the organolithium compound to the diamine compound may be about 2:1.

The tin coupling agents, as discussed above, are of the general formula (I) (X$_3$Sn)$_2$O or (II) (X$_3$Sn)$_2$O—(CH$_2$)$_n$—O(X$_3$Sn)$_2$, wherein X is a halogen, such as chlorine, and wherein n is 1 to 20. In one embodiment, the tin coupling agent is hexachlorodistannoxane, i.e., (Cl$_3$Sn)$_2$O, or bis(trichlorostannoxy) butane, i.e., (Cl$_3$Sn)O—(CH$_2$)$_4$—O(Cl$_3$Sn). Accordingly, each tin coupling agent provides six reactive halogen atoms. To that end, during polymerization, those halogen atoms can react with the lithium terminated chain ends of the polymerized monomers so that the coupling agent attaches itself to the rubbery polymer to provide a tin coupled rubbery polymer.

The molar ratio of the organolithium compound to the tin coupling agent will typically be within the range of about 0.1:1 to about 20:1. In one example, the molar ratio is within the range of 0.5:1 to about 15:1. In another example, the molar ratio of the organolithium compound to the tin coupling agent is within the range of about 1:1 to about 6:1. In yet another example, the molar ratio of the organolithium compound to the tin coupling agent is about 4:1.

The tin coupling agent will normally be present in the polymerization medium in an amount that is within the range of about 0.01 to about 1.5 phm (parts by 100 parts by weight of total monomer). In one example, from about 0.01 phm to about 1.2 phm of the tin coupling agent can be utilized.

As mentioned above, the method includes the synthesis of rubbery polymers that contain tin coupling agents defined by formulas (I) or (II) which can be utilized in tire tread rubbers, particularly in those treads containing carbon black fillers. The rubbery polymers can be synthesized from one or more different types of conjugated diene monomers, such as 1,3-butadiene, isoprene, 2,3-dimethylbutadiene, and optionally vinyl aromatic monomers, such as vinyl, divinyl, or trivinyl benzene monomers, including styrene, α-methyl styrene, p-tertiary-butyl styrene, methyl vinyl toluene, p-vinyl toluene. In one embodiment, the rubbery polymer defines a homopolymer. In another embodiment, the rubbery polymer defines a copolymer or a terpolymer with at least one polymerized monomer selected from butadiene.

In one example, the monomer is 1,3-butadiene to provide a polybutadiene rubber, i.e., a homopolymer. In another example, the monomers include 1,3-butadiene and styrene or 1,3-butadiene and isoprene to provide, respectively, a styrene-butadiene rubber or isoprene-butadiene rubber, which are copolymers. In another example, the monomers include 1,3-butadiene, isoprene, and styrene to provide a styrene-soprene-butadiene rubber, i.e., a terpolymer.

The polymerizations are typically carried out in a hydrocarbon solvent, such as one or more aromatic, paraffinic or cycloparaffinic compounds. The solvents generally will contain from 4 to 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, and petroleum naphtha, alone or in admixture. In the solution polymerizations, there typically will be from about 5 to about 30 weight percent monomers in the polymerization medium. Such polymerization media are comprised of the organic solvent and monomers. In another example, the polymerization medium may contain from about 10 to about 25 weight percent monomers. In yet another example, the polymerization medium can contain about 15 to about 20 weight percent monomers.

The copolymer rubbers derived from a conjugated diene monomer and a vinyl aromatic monomer will typically contain from about 2 weight percent to about 50 weight percent vinyl aromatic monomer, such as styrene, and from about 50 weight percent to about 98 weight percent conjugated diene monomer, such as 1,3-butadiene. However, in some cases, the amount of vinyl aromatic monomer included will be as low as about 1 weight percent. In another example, the copolymer rubbers will contain from about 3 weight percent to about 30 weight percent vinyl aromatic monomer and from about 70 weight percent to about 97 weight percent 1,3-conjugated diene monomer.

The copolymer rubbers derived from two different conjugated diene monomers, with one monomer being butadiene, will typically contain from about 50 weight percent to about 98 weight percent 1,3-butadiene and from about 2 weight percent to about 50 weight percent other conjugated diene monomer, such as isoprene. However, in some cases, the amount of other conjugated diene monomer included will be as low as about 1 weight percent.

The terpolymer rubbers derived from at least two different conjugated diene monomers, with one monomer being butadiene, and a vinyl aromatic monomer will typically contain from about 50 weight percent to about 98 weight percent 1,3-butadiene and from about 2 weight percent to about 50 weight percent vinyl aromatic monomer plus other conjugated diene monomer, such as isoprene.

The distribution of repeat units in the copolymer and terpolymer rubbers is essentially random. The term "random" as used herein means that less than 10 percent of the total quantity of repeat units of a monomer are in blocks containing more than five repeat units. In other words, more than 90 percent of the repeat units are in blocks containing five or fewer repeat units. The copolymers and terpolymers also tend to have a consistent composition throughout their polymer chains. In other words, the content of a specific monomer of the polymer will be about the same from the beginning to the end of the polymer chain. For example, no segments of at least 100 repeat units within the polymer will have a styrene content which differs from the total styrene content of the polymer by more than about 10 percent.

Polymers produced according to this invention can be of any molecular weight depending on the intended application. Generally, for purposes of making tire products, the molecular weight of the rubbery polymers should fall within the range from about 50,000 to about 1,000,000. In another example, the molecular weight of the rubbery polymers is from about 80,000 to about 500,000.

The polymerizations of this invention are initiated by adding the organolithium compound, and one or more optional modifiers, such as a diamine compound, to a polymerization medium, or premix, containing the monomers to be polymerized. The organolithium compound may be added to the premix in any desired amount. In one example, the organolithium compound is provided in an amount of about 0.100 mmole to about 0.900 mmol/per 100 parts by weight of total monomer. In another example, the organolithium compound is provided in an amount of about 0.200 mmole to about 0.700 mmol/per 100 parts by weight of total monomer.

Following initiation of anionic polymerization of the rubbery monomers in the presence of the organolithium compound, the tin coupling agent, e.g., $(Cl_3Sn)_2O$, can be added to the mixture of living polymers effecting polymerization conditions to form the tin coupled rubbery polymer. More specifically, during polymerization, the halogen atoms of the tin coupling agent can react with lithium terminated chain ends of the polymerized monomers so that the coupling agent attaches thereto to provide a tin coupled rubbery polymer.

The polymerization is conducted for a length of time sufficient to permit substantially complete polymerization of monomers. In other words, the polymerization is normally carried out until high conversions are attained. The polymerization temperature utilized can vary over a broad temperature range of from about 20° C. to about 180° C. In another example, a temperature within the range of about 40° C. to about 120° C. can be utilized. In yet another example, the polymerization temperature can be within the range of about 70° C. to about 100° C. The pressure used will normally be sufficient to maintain a substantially liquid phase under the conditions of the polymerization reaction. The polymerizations can be carried out utilizing batch, semi-continuous or continuous techniques, as known to those having ordinary skill in the art.

After the polymerization has been completed, the tin coupled rubbery polymer can be recovered from the organic solvent. The rubbery polymer can be recovered from the organic solvent and residue by means such as decantation, filtration, centrification, and others known to those having ordinary skill in the art. It can be desirable to precipitate the polymer from the organic solvent by the addition of lower alcohols containing from about 1 to about 4 carbon atoms to the polymer solution. Suitable lower alcohols for precipitation of the segmented polymer from the polymer cement include methanol, ethanol, isopropyl alcohol, normal-propyl alcohol and t-butyl alcohol. The utilization of lower alcohols to precipitate the rubber from the polymer cement also "kills" or terminates the living polymer by inactivating lithium end groups of the organolithium compound. The polymerization can also be terminated with other conventional noncoupling types of terminators, such as water, an acid, or with a coupling agent, for example. After the polymer is recovered from the solution, steam-stripping can be employed to reduce the level of volatile organic compounds in the rubber.

There are certain benefits in tire tread compounds derived from the rubbery polymers made with the catalyst systems. For example, polybutadiene rubber, styrene-butadiene rubber, isoprene-butadiene rubber, or styrene-isoprene-butadiene rubber containing the tin coupling agent can be blended, for example, with natural rubber and/or synthetic rubber to make tread compounds for passenger tires that can exhibit desirable rolling resistance, traction, tear, and/or tread wear characteristics.

Non-limiting examples of the tin coupled rubbery polymers, and methods of making thereof, in accordance with the description are now disclosed below. These examples are merely for the purpose of illustration and are not to be regarded as limiting the scope of the invention or the manner in which it can be practiced. Other examples will be appreciated by a person having ordinary skill in the art. Unless specifically indicated otherwise, parts and percentages are given by weight.

EXAMPLE 1 (CONTROL)

In this control experiment, 2000 g of a hexane premix containing about 20% butadiene monomer(s) was charged to a one gallon stainless steel reactor with an air-driven motor, a nitrogen inlet for providing an inert nitrogen atmosphere, and internal heating/cooling coils for temperature regulation. An anionic-polymerization initiator, i.e., butyllithium, and a modifier, i.e., N,N,N',N'-tetramethylethylene diamine ("TMEDA"), were added to the premix, respectively, in an amount of 0.5 mmol of initiator per 100 g of the premix and 1.0 mmol of modifier per 100 g of the premix. The molar ratio of butyllithium to TMEDA was 0.5:1. Additionally, 0.3 mmol tin tetrachloride, i.e, $SnCl_4$, was also added to the reactor.

Polymerization was carried out at 65° C. and the reaction monitored using gas chromatography ("GC") to detect for the presence of unreacted monomers. After polymerization was completed, ethanol was added to shortstop the polymerization. The polymer cement was then removed from the reactor and stabilized with antioxidant. After evaporating hexanes, the resulting polymer was dried in a vacuum oven. During polymerization, the halogen atoms of the tin coupling agent reacted with lithium terminated chain ends of the polymerized monomers so that the coupling agent attached thereto to provide a rubbery polymer that is tin coupled, i.e., a tin coupled polybutadiene rubber.

EXAMPLE 2

The procedure described in Example 1 was utilized in this example except that hexachlorodistannoxane, i.e., $(Cl_3Sn)_2O$, was used instead of tin tetrachloride to increase the bound rubbery polymer by maximizing the number of carbon-tin bonds between the polybutadiene rubber and the tin coupling agent.

EXAMPLE 3

The procedure described in Example 1 was utilized in this example except that bis(trichlorostannoxy) butane, i.e., $(Cl_3Sn)O$—$(CH_2)_4$—$O(Cl_3Sn)$, was used instead of tin tetrachloride to increase the bound rubbery polymer by maximizing the number of carbon-tin bonds.

The tin coupled rubbery polymers of Examples 1-3 were recovered and characterized using, for example, gel permeation chromatography (GPC). The GPC measurements indicated that the hexachlorodistannoxane functionalized polybutadiene rubber had a number average molecular weight (Mn) of about 100,000 g/mol and the bis(trichlorostannoxy) butane functionalized polybutadiene rubber had an Mn of about 125,000 g/mol whereas the tin tetrachloride functionalized styrene-butadiene rubber had an Mn of about 50,000 g/mol, which suggests that there was an increase in the amount of bound rubbery polymer with the hexachlorodistannoxane and bis(trichlorostannoxy) butane, i.e., that the number of carbon-tin bonds was maximized.

Further testing was conducted on Examples 1 and 2 above. More specifically, each tin coupled rubbery polymer was subjected to two mixing stages. The first mixing stage involved mixing the rubbery polymer with 2 phr stearic acid for six minutes at 120° C. The second mixing stage involved adding an additional 2 phr stearic acid to the first mix and mixing for ten additional minutes at 120° C. The resulting samples were oven dried for 48 hours under vacuum at 65° C. Size exclusion chromatography (SEC) was run prior to and after each mixing stage, and after drying. SEC analysis indicated that the hexachlorodistannoxane functionalized polybutadiene rubber encountered shear breakdown faster than the control, which is understood to provide greater interaction with carbon black filler in resulting rubber compounds, as discussed next, so as to yield a tire having desirable hysteresis, for example.

The rubbery polymers of the present invention, such as those of Examples 2 and 3, can be blended, for example, with natural rubber and/or synthetic rubber to make tread compounds for passenger tires that can exhibit desirable rolling resistance, traction, tear, tread wear, and impact strength characteristics. The tin coupled rubbery polymers may be further compounded with additional ingredients to provide a rubber compound, such as for use in a tire tread for a tire, which may have those desirable characteristics. Specifically selected additives may be provided in the rubber compound, such as, for example, carbon black filler and/or silica filler, as well as sulfur curing agents. Other additives may be added as desired or as necessary including activators, retarders and accelerators, rubber processing oils, resins including tackifying resins, plasticizers, fatty acid, zinc oxide, waxes, antidegradant, antiozonants, and peptizing agents. These other additives, depending on the intended use of the rubber compound, are selected and used in conventional amounts.

When compounding or further processing the rubbery polymers into a rubber compound, the tin coupling agent may further react with the filler to form a rubber compound having desirable polymer-filler interaction as well as performance characteristics. When carbon black is used as the filler in the rubber compound, such compound including the tin coupled rubbery polymer, the filler may be present in an amount of from about 30 phr to about 90 phr. In another embodiment, the filler may be present in an amount of from about 40 phr to about 80 phr.

The tin coupling agent is intended to improve the cold flow characteristics of the rubber compound and rolling resistance of tire components, such as tire treads, made therefrom. It also is intended to lead to better processability and other beneficial properties, such as a desirable Mooney viscosity (ML 4 at 100° C.) of from about 70 to about 110. In general terms, as understood by one having ordinary skill in the art, the tin coupling agent allows for better interactions of the rubbery polymer with the carbon black filler, which provides a more desirable rubber compound. More specifically, the tin coupling agent of the tin coupled rubbery polymer can further react with the carbon reinforcing filler, such as carbon black, when compounded with the same. As a result, the rubbery polymer can become chemically bonded to the carbon black surface, such as during curing or vulcanization.

The rubber compound, which includes, for example, the tin coupled rubbery polymer and carbon black, is compounded by methods generally known in the rubber compounding art, such as by mixing the various constituent materials in the amounts listed above at a temperature in a range of from about 135° C. to about 180° C. to form a green rubber. The green rubber may be further formed into a tire tread and cured on a tire (not shown) by means well known in the art. Such rubber compound provides desirable wear properties without substantially sacrificing other performance characteristic(s), e.g., traction properties.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described. Accordingly, departures may be made from such details without departing from the scope of the general inventive concept.

What is claimed is:

1. A tin coupled rubbery polymer comprising:
at least one type of anionically polymerized conjugated diene monomer and optionally an anionically polymerized vinyl aromatic monomer, and a tin coupling agent reacted with the polymerized monomers to provide the tin coupled rubbery polymer, the tin coupling agent defined by the formula (I) $(X_3Sn)_2O$ or (II) $(X_3Sn)O-(CH_2)_n-O(X_3Sn)$, wherein X is a halogen and n is 1 to 20.

2. The tin coupled rubbery polymer of claim 1 wherein the tin coupling agent is defined by formula (I) $(X_3Sn)_2O$.

3. The tin coupled rubbery polymer of claim 2 wherein X is chlorine.

4. The tin coupled rubbery polymer of claim 1 wherein the tin coupling agent is defined by formula (II) $(X_3Sn)O-(CH_2)_n-O(X_3Sn)$.

5. The tin coupled rubbery polymer of claim 4 wherein X is chlorine.

6. The tin coupled rubbery polymer of claim 4 wherein n is 4.

7. A rubber compound comprising:
a tin coupled rubbery polymer which includes at least one type of anionically polymerized conjugated diene monomer and optionally an anionically polymerized vinyl aromatic monomer, and a tin coupling agent reacted with the polymerized monomers to provide the tin coupled rubbery polymer, the tin coupling agent defined by the formula (I) $(X_3Sn)_2O$ or (II) $(X_3Sn)O-(CH_2)_n-O(X_3Sn)$, wherein X is a halogen and n is 1 to 20.

8. The rubber compound of claim 7 wherein the tin coupling agent is defined by formula (I) $(X_3Sn)_2O$.

9. The rubber compound of claim 7 wherein the tin coupling agent is defined by formula (II) $(X_3Sn)O-(CH_2)_n-O(X_3Sn)$.

10. The rubber compound of claim 7 further comprising from about 30 phr to about 90 phr of filler material.

11. The rubber compound of claim 10 wherein the filler material is carbon black.

12. A tire comprising the rubber compound of claim 7.

13. The tire of claim 12 wherein the rubber compound further comprises silica filler, carbon black filler, or mixtures thereof.

14. A method comprising:
anionically polymerizing one or more different types of conjugated diene monomers and optionally vinyl aromatic monomers in the presence of an organolithium initiator and a tin coupling agent for synthesizing rubbery polymers that are tin coupled, the tin coupling agent defined by the formula (I) $(X_3Sn)_2O$ or (II) $(X_3Sn)O-(CH_2)_n-O(X_3Sn)$, wherein X is a halogen and n is 1 to 20.

15. The method of claim 14 wherein polymerizing the conjugated diene monomer in the presence of an organolithium initiator and a tin coupling agent includes polymerizing the vinyl aromatic monomer with the one or more different types of conjugated diene monomers, and wherein the vinyl aromatic monomer is styrene and the one or more different types of conjugated diene monomers is butadiene or butadiene and isoprene for synthesizing styrene-butadiene rubber or styrene-isoprene-butadiene that are tin coupled.

16. The method of claim 14 wherein polymerizing the conjugated diene monomer in the presence of an organolithium initiator and a tin coupling agent includes polymerizing the one or more different types of conjugated diene monomers, and wherein the one or more different types of conjugated diene monomers is butadiene or butadiene and isoprene for synthesizing butadiene rubber or isoprene-butadiene rubber that is tin coupled.

17. The method of claim 14 wherein the tin coupling agent is defined by formula (I) $(X_3Sn)_2O$.

18. The method of claim 14 wherein the tin coupling agent is defined by formula (II) $(X_3Sn)O-(CH_2)_n-O(X_3Sn)$.

* * * * *